United States Patent
Ueno et al.

(10) Patent No.: US 11,067,036 B2
(45) Date of Patent: Jul. 20, 2021

(54) COMBUSTOR AND JET ENGINE HAVING THE SAME

(71) Applicant: MITSUBISHI HEAVY INDUSTRIES, LTD., Tokyo (JP)

(72) Inventors: Yoshihiko Ueno, Tokyo (JP); Tasuku Suzuki, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 464 days.

(21) Appl. No.: 15/120,859

(22) PCT Filed: Feb. 13, 2015

(86) PCT No.: PCT/JP2015/054025
§ 371 (c)(1),
(2) Date: Aug. 23, 2016

(87) PCT Pub. No.: WO2015/146356
PCT Pub. Date: Oct. 1, 2015

(65) Prior Publication Data
US 2017/0058835 A1    Mar. 2, 2017

(30) Foreign Application Priority Data
Mar. 26, 2014   (JP) .............................. JP2014-064200

(51) Int. Cl.
*F02K 7/00* (2006.01)
*F02K 7/10* (2006.01)
*F02C 7/264* (2006.01)

(52) U.S. Cl.
CPC .............. *F02K 7/105* (2013.01); *F02C 7/264* (2013.01); *F02K 7/10* (2013.01); *F05D 2220/10* (2013.01); *F05D 2260/99* (2013.01); *Y02T 50/60* (2013.01)

(58) Field of Classification Search
CPC ... F02K 7/10; F02K 7/105; F02K 7/14; F02K 7/16; F02K 7/18; F02K 9/95; F02C 7/264; F05D 2220/10; F05D 2260/99
See application file for complete search history.

(56) References Cited

U.S. PATENT DOCUMENTS 2,989,922 A * 6/1961 Greenwood .............. F02K 7/18
102/380
3,667,233 A   6/1972 Curran et al.
(Continued)

FOREIGN PATENT DOCUMENTS

| GB | 2 274 881 | 8/1994 |
|----|-----------|--------|
| JP | 2-275051  | 11/1990 |

(Continued)

OTHER PUBLICATIONS

Office Action dated Dec. 6, 2017 in corresponding Japanese Application No. 2014-064200, with English translation.
(Continued)

*Primary Examiner* — Todd E Manahan
*Assistant Examiner* — Edwin Kang
(74) *Attorney, Agent, or Firm* — Wenderoth, Lind & Ponack, L.L.P.

(57) ABSTRACT

A jet engine includes an inlet that takes air, and a combustor that burns fuel using the air. The combustor includes a fuel injector and an igniter for igniting a gas mixture of the air and the fuel. The igniter ignites and activates automatically by heat and pressure created by compression of the air that has been taken in through the inlet.

7 Claims, 7 Drawing Sheets

(56) References Cited

U.S. PATENT DOCUMENTS

| | | | |
|---|---|---|---|
| 3,942,320 A | 3/1976 | Ortwerth et al. | |
| 4,381,642 A * | 5/1983 | Giles, Jr. | F02K 7/18 60/204 |
| 4,441,312 A * | 4/1984 | Smith | F02K 9/346 60/245 |
| 5,010,728 A | 4/1991 | Joy | |
| 5,072,582 A | 12/1991 | Harshman | |
| 5,223,651 A * | 6/1993 | Stickler | F02K 7/10 60/203.1 |
| 5,660,357 A * | 8/1997 | Grossman | B64D 33/02 102/293 |
| 5,857,339 A | 1/1999 | Roquemore et al. | |
| 8,256,203 B1 | 9/2012 | Blackmon et al. | |
| 2003/0136110 A1 | 7/2003 | Kline et al. | |
| 2004/0000134 A1 | 1/2004 | Tew et al. | |
| 2004/0144886 A1 | 7/2004 | Le Helley et al. | |
| 2007/0044449 A1 | 3/2007 | O'Brien et al. | |
| 2009/0205311 A1 | 8/2009 | Bulman et al. | |
| 2011/0314791 A1 * | 12/2011 | Haynes | C23C 24/04 60/253 |
| 2013/0087109 A1 | 4/2013 | Naitoh | |
| 2013/0118147 A1 * | 5/2013 | Mihara | F02K 9/12 60/256 |

FOREIGN PATENT DOCUMENTS

| | | |
|---|---|---|
| JP | 5-180078 | 7/1993 |
| JP | 6-60597 | 8/1994 |
| JP | 6-241119 | 8/1994 |
| JP | 3032377 | 4/2000 |
| JP | 2011-508126 | 3/2011 |
| JP | 2012-13007 | 1/2012 |
| JP | 2012-13008 | 1/2012 |
| JP | 2012-207555 | 10/2012 |
| JP | 2012-207610 | 10/2012 |
| WO | 2011/155248 | 12/2011 |

OTHER PUBLICATIONS

International Search Report dated May 19, 2015 in corresponding International Application No. PCT/JP2015/054025.
International Search Report dated May 19, 2015 in related International Application No. PCT/JP2015/054027.
Extended European Search Report dated Feb. 10, 2017 in corresponding European Application No. 15768446.5.
Extended European Search Report dated Feb. 15, 2017 in corresponding European Application No. 15767934.1.
Office Action dated Oct. 18, 2018 in related U.S. Appl. No. 15/121,172.
International Preliminary Report on Patentability dated Sep. 27, 2016 in corresponding International Application No. PCT/JP2015/054025.
Office Action dated Dec. 10, 2018 in U.S. Appl. No. 15/121,172.

* cited by examiner

INLET COVER (SEPARATION)

Fig. 5A

| TOTAL TEMPERATURE (K) | ALTITUDE km | | |
|---|---|---|---|
| | 0km | 20km | 30km |
| MACH NUMBER 0 | 288.2 | 223.2 | 226.7 |
| 1 | 346.1 | 268.0 | 272.2 |
| 2 | 519.8 | 402.6 | 408.9 |
| 3 | 809.4 | 626.8 | 636.7 |
| 4 | 1214.8 | 940.8 | 955.6 |
| 5 | 1736.1 | 1344.5 | 1365.6 |
| 6 | 2373.2 | 1837.9 | 1866.7 |
| 7 | 3126.1 | 2421.0 | 2458.9 |
| 8 | 3994.9 | 3093.8 | 3142.3 |

Fig. 5B

| TOTAL PRESSURE (Pa) | ALTITUDE km | | |
|---|---|---|---|
| | 0km | 20km | 30km |
| MACH NUMBER 0 | 1.01.E+05 | 2.64.E+04 | 1.17.E+03 |
| 1 | 1.92.E+05 | 5.01.E+04 | 2.22.E+03 |
| 2 | 7.93.E+05 | 2.07.E+05 | 9.17.E+03 |
| 3 | 3.72.E+06 | 9.70.E+05 | 4.30.E+04 |
| 4 | 1.53.E+07 | 4.00.E+06 | 1.77.E+05 |
| 5 | 5.32.E+07 | 1.39.E+07 | 6.15.E+05 |
| 6 | 1.58.E+08 | 4.13.E+07 | 1.83.E+06 |
| 7 | 4.14.E+08 | 1.08.E+08 | 4.78.E+06 |
| 8 | 9.73.E+08 | 2.54.E+08 | 1.13.E+07 |

COMBUSTOR AND JET ENGINE HAVING THE SAME

TECHNICAL FIELD

The present invention relates to a combustor, a jet engine, a flying body, and an operation method of a jet engine.

BACKGROUND ART

As a jet engine of a flying body to be flying faster than a speed of sound, a turbojet engine (including a turbofan engine etc.), a ramjet engine and a scramjet engine are known. These are jet engines, and in particular in the ramjet engine and the scramjet engine, a speed of air taken therein depends strongly on a flight speed.

FIG. 1 is a schematic cross-sectional view schematically indicating a configuration of a conventional jet engine. The jet engine includes an airframe 110, and a cowl 140 which is provided so as to form a space 150, through which gas can flow, below the airframe 110. A lower portion of a front side part of the airframe 110 and a front side part of the cowl 140 constitute an inlet 111 for introducing air into the space 150. Further, in front of the inlet 111, an inlet cover is provided so as to be separable from the inlet. The inlet cover is mounted on a forward side of the inlet 111 before the engine starts. Thus, the inlet cover is used for reducing aerodynamic resistance of the airframe and preventing a foreign object from entering the engine until time of starting the engine. A lower portion of an intermediate part of the airframe 110 and an intermediate part of the cowl 140 constitute a combustor 112 for mixing fuel and the air and burning a gas mixture. A lower portion of a rear side part of the airframe 110 and a rear side part of the cowl 140 constitute nozzle 113 for expanding and emitting combustion gas. The combustor 112 includes a fuel injector 120, an igniter 121, an igniter driver 122, and an igniter controller 123. The fuel injector 120 is provided at a part of the lower portion of the airframe 110 corresponding to the combustor 112. The fuel injector 120 injects the fuel toward the space 150. The igniter 121 emits flame for igniting the gas mixture of the fuel and the air toward the space 150. The igniter driver 122 starts the igniter 121 using electrical energy or thermal energy etc. The igniter controller 123 generates a signal or the like for starting the igniter driver 122.

Procedure of an operation of jet engine shown in FIG. 1 is as follows. Firstly, after the flying body reaches a desired speed, the inlet cover is separated from the inlet 111. Secondly, the igniter controller 123 generates the signal or the like for starting the igniter driver 122, and the signal or the like is transmitted to the igniter driver 122. Thirdly, based on the transmitted signal or the like, the igniter driver 122 starts, and generates the electrical energy, the thermal energy etc. Using the electrical energy, the thermal energy etc., the igniter 121 starts. The igniter 121, which has started, emits the flame toward the space 150. At timing before or after the emission of the flame, the fuel injector 120 injects the fuel toward the space 150. The injected fuel is ignited using the flame, and combusts. The combustion continues by continuously injecting the fuel from the fuel injector 120. The combustion gas produced by the combustion is discharged from the nozzle 113. The airframe 110 obtains thrust to fly by discharging the combustion gas.

As a related technology, in Japanese Patent Literature JP H06-060597 B2, an ignition and flame-holding method of scramjet engine is disclosed. This literature discloses an igniter, but a specific operation procedure of the igniter is not disclosed.

CITATION LIST

Patent Literature

Patent Literature 1: JP H06-060597 B2

SUMMARY OF THE INVENTION

An object of the present invention is to provide a combustor, a jet engine, a flying body, and an operation method of a jet engine with which weight of airframe can be reduced and design of the airframe can be simplified.

A combustor according to some embodiments is a combustor for burning fuel using air taken through an inlet. The combustor includes an igniter for igniting a gas mixture of the air and the fuel. The igniter autoignites and is activated due to heat and pressure created by compression of the air which has been taken through the inlet.

An operation method of a jet engine according to some embodiments is an operation method of a jet engine which includes an inlet for taking air, a combustor for generating combustion gas by burning fuel using the air, and a nozzle for ejecting the combustion gas from a rearward side of the jet engine. The combustor includes an igniter for igniting a gas mixture of the air and the fuel. The operation method includes a step of taking the air through the inlet, and autoigniting and activating the igniter using heat and pressure created by compression of the air which has been taken through the inlet, and a step of emitting flame generated by igniting the igniter toward the gas mixture of the air and the fuel, and burning the gas mixture using the flame to start the jet engine.

According to the present invention, the combustor, the jet engine, the flying body, and the operation method of the jet engine with which the weight of the airframe can be reduced and the design of the airframe can be simplified are provided.

BRIEF DESCRIPTION OF THE DRAWINGS

The accompanying drawings are incorporated into the specification to assist in explaining some embodiments. The drawings are not to be construed as limiting the inventions to only those examples illustrated and described.

FIG. 5A is a table indicating a relationship among Mach number, altitude and total temperature.

FIG. 5B is a table indicating a relationship among the Mach number, the altitude and total pressure.

DESCRIPTION OF EMBODIMENTS

Hereinafter, a combustor, a jet engine, a flying body, and an operation method of a jet engine according to some embodiments will be explained with reference to the accompanying drawings. Here, an example in which the jet engine is applied to the flying body will be explained. In the following detailed description, for purpose of explanation, numerous specific details are set forth in order to provide a thorough understanding of the disclosed embodiments. It will be apparent, however, that one or more embodiments may be practiced without these specific details.

Figure 1:
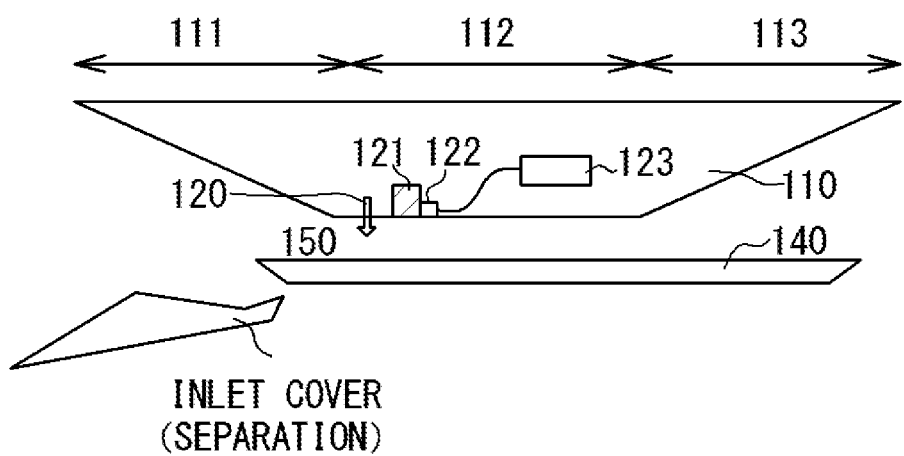
FIG. 1 is the schematic cross-sectional view schematically indicating the configuration of the conventional jet engine.
Figure 2:
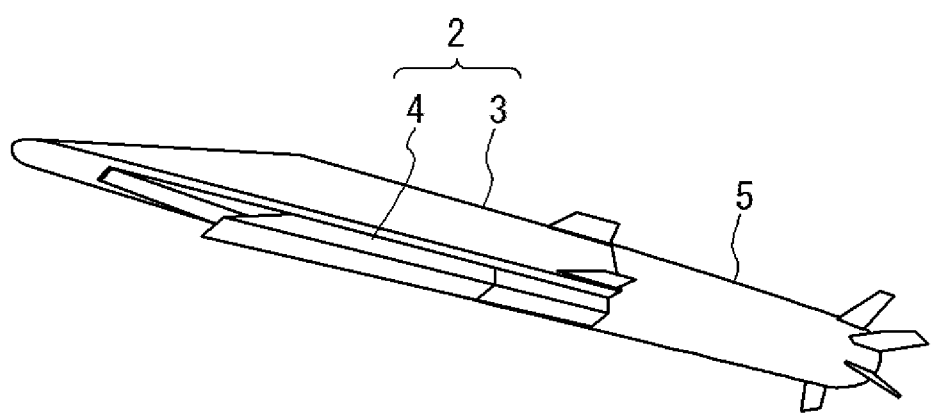
FIG. 2 is a perspective view indicating an example of a configuration of a flying body according to some embodiments.

A configuration of the flying body 1 according to some embodiments will be explained. FIG. 2 is the perspective view indicating the example of the configuration of the flying body 1 according to some embodiments. The flying body 1 includes a jet engine 2 and a propulsion device 5. The propulsion device 5 accelerates the flying body 1 from a speed at time of a flight start to a desired speed when the flying body 1 is launched from a launching unit. Note that the speed at the time of the flight start is zero in a case in which the flying body 1 is launched from the launching unit which is not moving. On the other hand, the speed at the time of the flight start is equal to a moving speed (or a flight speed) of a moving object (or a flying object) in a case in which the flying body is launched from the launching unit of the moving object (or the flying object) which is presently moving (or flying). As a specific example of the propulsion device 5, a rocket motor can be exemplified. However, the propulsion device 5 may be any type of device as long as it can accelerate the flying body to the desired speed. For example, in a case in which the flying body 1 is mounted on a second flying body different from the flying body 1 and is accelerated to the desired speed, the second flying body is the propulsion device 5.

The jet engine 2 further accelerates the flying body 1 and make the flying body 1 fly toward a target after the propulsion device 5 is separated from the flying body 1. The jet engine 2 includes an airframe 3 and a cowl 4. As will be described later, the airframe 3 and the cowl 4 constitute an inlet, a combustor and a nozzle of the jet engine 2. The jet engine 2 takes in air from a front side using the inlet, mixes the air and fuel and burns the fuel in the combustor, and expands combustion gas in the nozzle and exhausts it rearwardly. Thus, the jet engine 2 can obtain thrust. Note that, in FIG. 2, the jet engine 2 is constituted by a lower portion of the airframe 3 and the cowl 4. However, the jet engine 2 may be constituted by a tubular body which is disposed under or in the airframe 3. In this case, a front side part of the tubular body constitutes the inlet, an intermediate part of the tubular body constitutes the combustor, and a rear side part of the tubular body constitutes the nozzle.

Hereinafter, some embodiments will be described in detail.

First Embodiment

Figure 3:
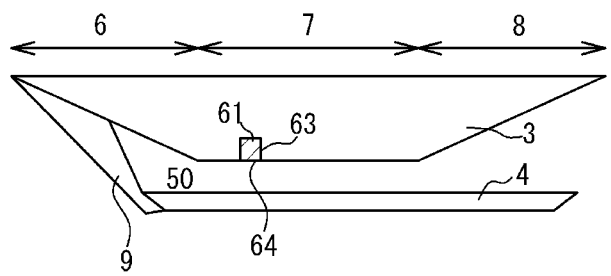
FIG. 3 is a schematic cross-sectional view schematically indicating a configuration of a jet engine according to a first embodiment, and indicating a state before an engine and an igniter start.
Figure 4:
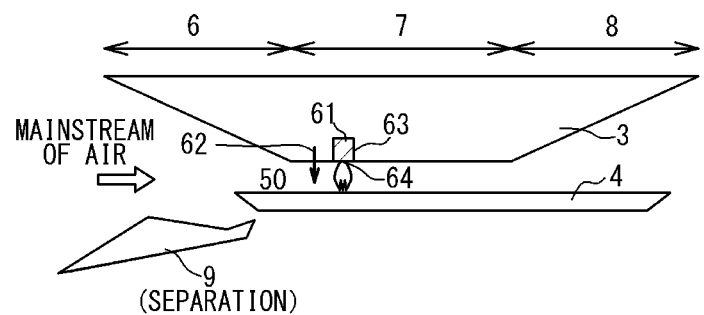
FIG. 4 is a schematic cross-sectional view schematically indicating the configuration of the jet engine according to the first embodiment, and indicating a state at time of starting the engine and the igniter.

Hereinafter, with reference to FIG. 3 and FIG. 4 in addition to FIG. 2, the jet engine according to the first embodiment will be explained. FIG. 3 and FIG. 4 are the schematic cross-sectional views schematically indicating the example of the configuration of the jet engine according to the first embodiment. FIG. 3 is the view indicating the state before the engine and the igniter start. FIG. 4 is the view indicating the state at the time of starting the engine and the igniter.

The jet engine 2 includes the airframe 3, and the cowl 4 which is provided so as to form a space 50, through which gas can flow, below the airframe 3. A lower portion of a front side part of the airframe 3 and a front side part of the cowl 4 constitute the inlet 6 for introducing the air into the space 50. Further, in front of the inlet 6, an inlet cover 9 is provided so as to be separable from the inlet 6. A lower portion of an intermediate part of the airframe 3 and an intermediate part of the cowl 4 constitute a combustor 7 for mixing the fuel and the air and burning a gas mixture. A lower portion of a rear side part of the airframe 3 and a rear side part of the cowl 4 constitute nozzle 8 for expanding and emitting the combustion gas. The combustor 7 includes an igniter 61, and a fuel injector 62.

The fuel injector 62 is provided at a part of the lower portion of the airframe 3 corresponding to the combustor 7. The fuel injector 62 injects the fuel stored in the airframe 3 toward the space 50. The igniter 61 burns, for example, a solid fuel to emit flame toward the space 50. As will be described later, the igniter 61 automatically catches fire and is automatically activated by heat and pressure created by compression of the air taken through the inlet 6. In the present embodiment, since the igniter is of the autoignition, an igniter controller and an igniter driver are not provided.

In jet engines, there is a case in which additional equipment such as the igniter controller and the igniter driver is provided. On the other hand, in the present embodiment, the igniter controller and the igniter driver are not provided. As a result, weight of the airframe can be reduced, and it is possible to simplify design of the airframe.

In addition, when the jet engine is provided with the igniter controller and the igniter driver, a cable unit which connects the igniter controller to the igniter driver can be a fragile part in the engine. Therefore, periphery of the cable unit is reinforced. Furthermore, since a passage etc. through which the cable unit passes can be a leak passage, some measures for ensuring air-tightness are adopted. As a result of the reinforcement or ensuring air-tight ness, the weight of the airframe is increased and the design of the airframe is complicated. In the present embodiment, the cable unit connecting the igniter controller to the igniter driver is not provided. As a result, it is possible to reduce the weight of the airframe and simplify the design of the airframe.

Figure 5C:
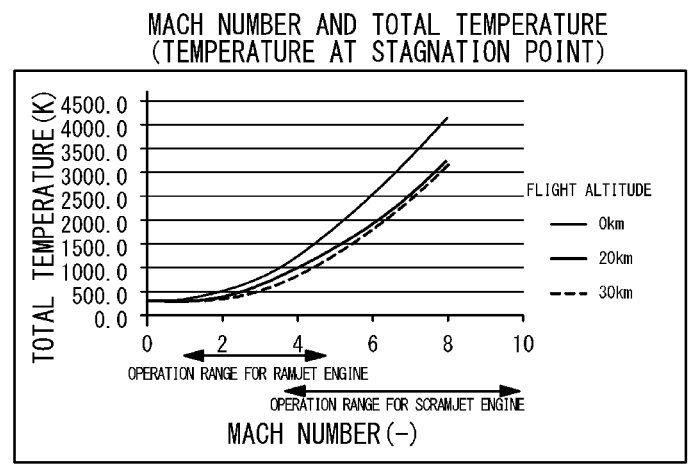
FIG. 5C is a graph indicating the relationship among the Mach number, the altitude and the total temperature.
Figure 5D:
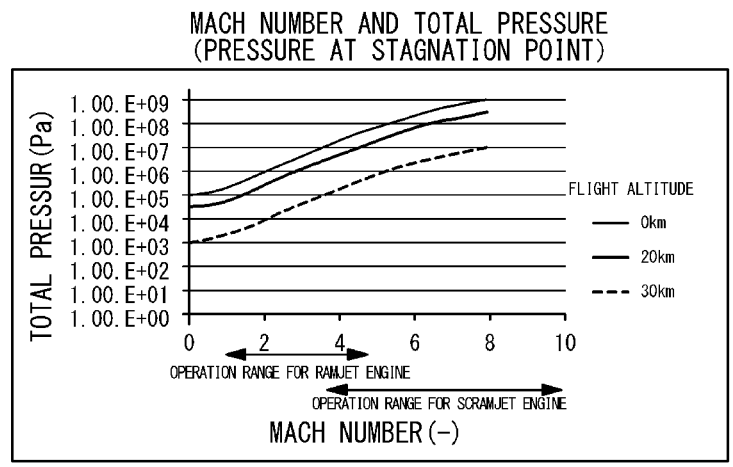
FIG. 5D is a graph indicating the relationship among the Mach number, the altitude and the total pressure.

Here, further explanation about the igniter 61 will be made. The igniter 61 is embedded in a groove 63 provided in a wall surface of the combustor 7. The igniter 61 is, for example, a solid rocket motor (solid RM). In the present specification, the solid rocket motor is defined as a device that emits the flame by burning a solid fuel. The solid rocket motor that is used in the present embodiment is preferably a solid rocket motor having low ignition temperature which catches fire at temperature no greater than about 0.8 times of temperature corresponding to flight Mach number and altitude indicated in FIG. 5A, FIG. 5C. As the solid rocket motor having low ignition temperature, material having $KClO_3$ (70 weight %), lactose (25 weight %) and aliphatic polycarbonate (5 weight %) which autoignites at 195 degrees Celsius is exemplified. The above-mentioned material is explained in JP 2001-503350 A in detail.

Next, operating principle of the igniter 61 will be further explained. After the flying body 1 reaches the desired speed, the inlet cover 9 is separated from the inlet 6. By separating the inlet cover 9, high speed air flows into the space 50 and a mainstream of air is formed. Then, the mainstream of air is compressed as it flows from the inlet 6 toward the combustor 7 and temperature increases due to generally adiabatic compression. Then, the compressed mainstream is decelerated to zero speed by friction in the vicinity of the wall surface of the combustor 7, and kinetic energy is converted to the temperature. As a result, the temperature further increases. Thus, the temperature and pressure on the wall surface of the combustor 7 increase. Referring to FIGS. 5A to 5D, in theory, for example, when the flying body flies in a region of 20 km altitude at Mach 3, the temperature in the vicinity of the wall surface of the combustor 7 reaches a value which can be obtained by substituting a value corresponding to temperature decrease due to heat transfer to the wall surface and the mainstream of air from a value of 626.8 K (353.7 degrees Celsius). When the flying body flies in the region of 20 km altitude at Mach 3, the pressure in the vicinity of the wall surface of the combustor 7 reaches a value which can be obtained by substituting a value corresponding to pressure loss during the compression from a value of 0.97 Mega Pascal. At a portion 64, which faces the space 50, of the igniter 61 provided in the groove 63 in the combustor wall surface (hereinafter, referred to as an "igniter surface portion 64"), the temperature and pressure also increase like at the wall surface of the combustor 7. When the temperature and pressure of the igniter surface portion 64 rise above values corresponding to ignition conditions of the solid rocket motor which is the igniter 61, the igniter 61 automatically catches fire and emits the flame toward the space 50. Note that, in general, it is known that as the pressure increases, spontaneous combustion temperature becomes low. Therefore, in a case in which the material having $KClO_3$ (70 weight %), lactose (25 weight %) and aliphatic polycarbonate (5 weight %), which spontaneously ignites at 195 degrees Celsius at atmospheric pressure, is used as the solid rocket motor, this solid rocket motor will spontaneously ignite at temperature lower than 195 degrees Celsius under the condition of higher pressure than the atmospheric pressure.

Subsequently, an operation method of the flying body 1 and the jet engine 2 according to some embodiments will be explained.

Firstly, the inlet cover 9 is separated from the inlet 6, after the flying body reaches the desired speed. Then, the high speed air flows into the space 50. As a result, as described above, the temperature and pressure of the igniter surface portion 64 increase. Then, if the temperature and pressure of the igniter surface portion 64 become higher than the values corresponding to the ignition conditions of the solid rocket motor which is the igniter 61, the igniter 61 automatically catches fire and emits the flame toward the space 50. At timing before or after the emission of the flame (i.e., at timing immediately before the emission of the flame, at timing simultaneous to the emission of the flame, or at timing immediately after the emission of the flame), the fuel injector 62 injects the fuel toward the space 50. The injected fuel is ignited by the flame and combusts. By continuously injecting the fuel from the fuel injector 62, the combustion continues. The combustion gas produced by the combustion is discharged from the nozzle 8. By discharging the combustion gas, the flying body 1 obtains the thrust and flies.

Start-up timing of the igniter 61, that is, timing of ignition can be controlled by timing of separating the inlet cover 9 from the inlet. Typically, time required until the ignition from the separation of the inlet cover 9 is on the order of a few milliseconds to a few seconds. The separation of the inlet cover 9 may be automatically or manually carried out by remote control. Alternatively, it is possible to measure elapsed time from reference time using a timer or the like, while the reference time is, for example, take-off time of the flying body 1, and the inlet cover 9 may be automatically separated from the inlet when the elapsed time exceeds a predetermined time. Alternatively, it is possible to install on the flying body 1 an altimeter, a speedometer or a Mach meter, and the inlet cover 9 may be automatically separated from the inlet when the altitude, speed or Mach number exceeds a predetermined value. For example, if a ramjet is adopted, it is preferable that the inlet cover is automatically separated from the inlet when the Mach number exceeds the predetermined value ranging from 1 to 5.

The jet engine may include a controller (not shown) for controlling the separation of the inlet cover. The controller is, for example, a computer including a hardware processor, a memory and a communications interface. In the controller, an operation signal is inputted from, for example, a remote control device (not shown). The controller sends a separation signal to an inlet cover separation mechanism (not shown) when the operation signal is inputted therein. The inlet cover separation mechanism separates the inlet cover 9 from the jet engine in response to receiving the separation signal.

Alternatively or additionally, the controller includes a timer (the timer may be a timer that is realized by executing a program by a hardware processor). The timer sends an expiration signal to the controller when the elapsed time from the reference time exceeds the predetermined value. The controller sends the separation signal to the inlet cover separation mechanism (not shown) when the expiration signal is inputted therein. The inlet cover separation mechanism separates the inlet cover 9 from the jet engine in response to receiving the separation signal.

Alternatively or additionally, the jet engine or the flying body includes a sensor such as the altimeter, the speedometer or the Mach meter. The controller receives a signal corresponding to a measured value from the sensor. The controller sends the separation signal to the inlet cover separation mechanism (not shown) when the measured value corresponding to the signal received from the sensor reaches a predetermined threshold value. The inlet cover separation mechanism separates the inlet cover 9 from the jet engine in response to receiving the separation signal.

The flying body 1, the jet engine 2 and the combustor 7 according to the present embodiment, the igniter controller, the igniter driver and the cable between the igniter controller and the igniter driver and so on are not provided for start-up of the igniter. As a result, it is possible to reduce the weight of the flying body 1, the jet engine 2 and the combustor 7, and simplify the structure and design. Further, it is possible to reduce manufacturing costs of the flying body 1, the jet engine 2 and the combustor 7. In addition, due to the weight reduction etc., performance of the flying body 1 and the jet engine 2 is improved. In addition, in a case in which the timing of the separation of the inlet cover 9 is controlled based on the measured value obtained from the timer, the altimeter, the speedometer or the Mach meter, the timing of activating the igniter 61 can be accurately controlled despite of the simple structure.

Alternative Example of the First Embodiment

Figure 6:
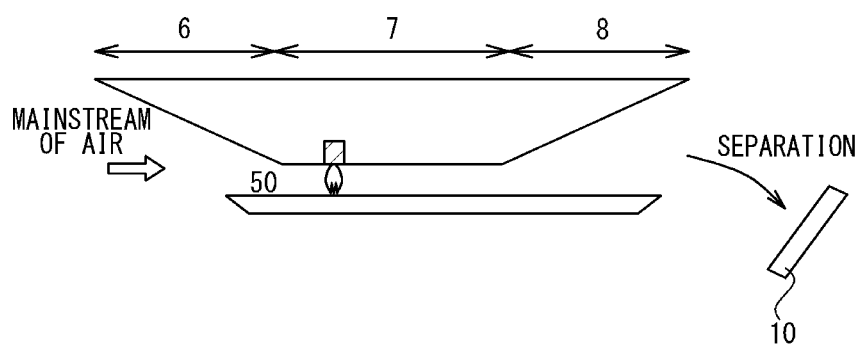
FIG. 6 is a schematic cross-sectional view schematically indicating the configuration of the jet engine according to an alternative example of the first embodiment, and indicating a state at time of starting the engine and the igniter.

FIG. 6 is the schematic cross-sectional view schematically indicating the configuration of the jet engine according to the alternative example of the first embodiment, and indicating the state at the time of starting the engine and the igniter. In the first embodiment, the timing of activating the igniter 61 is controlled by the separation of the inlet cover 9. However, it is also possible that a nozzle cover 10 is provided rearward of the nozzle 8 instead of providing the inlet cover 9, and the timing of activating the igniter 61 is controlled by a separation of the nozzle cover 10. That is, when the nozzle cover 10 is attached to the nozzle 8, the air flow into the space 50 is suppressed. Therefore, the temperature and pressure of the igniter surface portion 64 cannot exceed the values corresponding to the ignition conditions of the rocket motor which is the igniter 61. On the other hand, as shown in FIG. 6, after the nozzle cover 10 is separated from the nozzle 8, the high speed air flows into the space 50. Thus, the temperature and pressure of the igniter surface portion 64 rise to exceed the values corresponding to the ignition conditions of the rocket motor which is the igniter 61. As a result, the igniter 61 automatically catches fire. Note that the nozzle cover 10 may be any type of cover as long as it substantially covers the flow passage of the nozzle, and it is also possible that the propulsion device 5 functions as the nozzle cover 10.

Note that any mechanism other than the separation mechanism of the inlet cover or the nozzle cover can also be adopted as long as it can control state change from a state in which the temperature and the pressure of the igniter surface portion 64 do not exceed the values corresponding to the ignition conditions of the solid rocket motor which is the igniter 61 to a state in which the temperature and the pressure of the igniter surface portion exceed the values corresponding to the ignition conditions of the solid rocket motor which is the igniter.

The alternative example of the first embodiment has the same effects as the first embodiment. Note that, in the alternative example, a nozzle cover separation mechanism (not shown) may be provided. Procedure for operating the nozzle cover separation mechanism is the same as the procedure for operating the inlet cover separation mechanism in the first embodiment. (e.g., the controller sends the separation signal to the nozzle cover separation mechanism in response to the operation signal, the expiration signal or the signal received from the sensor. The nozzle cover separation mechanism separates the nozzle cover from the jet engine in response to receiving the separation signal.)

Second Embodiment

Figure 7:
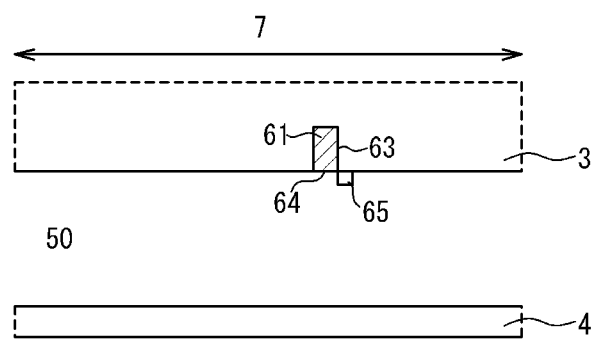
FIG. 7 is a schematic cross-sectional view schematically indicating a configuration of a jet engine combustor 7 according to a second embodiment, and indicating the state before the engine and the igniter start.
Figure 8:
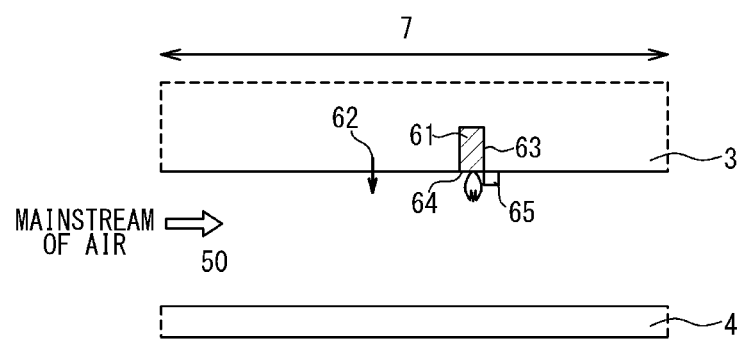
FIG. 8 is a schematic cross-sectional view schematically indicating the configuration of the jet engine combustor 7 according to the second embodiment, and indicating the state at time of starting the engine and the igniter.

Hereinafter, with reference to FIG. 7 and FIG. 8, the jet engine according to the second embodiment will be explained. FIG. 7 and FIG. 8 are the schematic cross-sectional views schematically indicating the example of the configuration of the combustor 7 of the jet engine according to the second embodiment. FIG. 7 is the view indicating the state before the engine and the igniter start. FIG. 8 is the view indicating the state at the time of starting the engine and the igniter.

In the second embodiment, for the same components as those of the first embodiment, the same reference numerals are used. The second embodiment differs from the first embodiment in points in which a stagnation former 65 is provided for the second embodiment, and the ignition temperature of the igniter 61 such as the rocket motor of the second embodiment is higher than that of the first embodiment.

The stagnation former 65 is provided in the vicinity of the igniter surface portion 64. Typically, for example, as shown in FIG. 7 and FIG. 8, the stagnation former is provided on the wall surface of the combustor 7 and is provided rearward of the igniter surface portion 64. The stagnation former 65 is preferably provided such that the stagnation former is in contact with the igniter surface portion 64 or is located at a small distance from the igniter surface portion 64 and such that the stagnation former is located rearward of the igniter surface portion 64. Note that, in the present embodiment, words of "forward" and "rearward" mean upstream side of the mainstream of air and downstream side of the mainstream of air, respectively.

Operating principle of the igniter 61 according to the present embodiment will be explained. Using the separation of the inlet cover 9, the separation of the nozzle cover 10 etc. as a trigger, the mainstream of air enters the space 50. A part of the mainstream of air is dammed by the stagnation former 65, and the temperature and pressure of the dammed air are greatly increased. As a result, when the temperature and pressure on the igniter surface portion 64 rise to exceed the values corresponding to the ignition conditions of the rocket motor which is the igniter 61, the igniter 61 automatically catches fire, and emits the flame toward the space 50. Note that heat transfer between the dammed air by the stagnation former 65 and the air flowing in the vicinity of the wall surface or the stagnation former 65 is smaller than heat transfer between the air of zero speed on the igniter surface portion 64 and the air flowing in the vicinity of the igniter surface portion 64 in the first embodiment. In addition, pressure loss of the air which is dammed by the stagnation former 65 is smaller than that of the air of zero speed on the igniter surface portion 64 in the first embodiment. Therefore, increase in temperature and pressure in a forward region of the stagnation former 65 is greater than increase in temperature and pressure on the igniter surface portion 64 in the first embodiment. Thus, it is possible to adopt the solid rocket motor having higher ignition temperature in the present embodiment as compared with the solid rocket motor used in the first embodiment. For example, in the present embodiment, the solid rocket motor having high ignition temperature which catches fire at temperature no greater than temperature corresponding to the flight Mach number and altitude indicated in FIG. 5A, FIG. 5C. As the solid rocket motor having high ignition temperature, for example, AP/C$_2$H$_4$O/Al which catches fire at 400 degrees Celsius is exemplified.

Note that, since the stagnation former 65 is acted as fluid resistance against the mainstream of air, it is a factor of lowering the performance of the engine 2. Therefore, it is preferable that the stagnation former 65 is constituted by material which automatically disappears (fuses, burns etc.) by the heat and pressure after the activation of the igniter 61. For example, the stagnation former includes ablation material such as silica or phenol, metal such as aluminum, or gunpowder. Note that the stagnation former 65 may be formed rearward of the igniter 61 so as to have the same span (length along width direction) as the igniter 61, or may be formed so as to have shorter span (length along width direction) than the igniter 61. In the latter case, a plurality of the stagnation formers 65 may be formed along the span direction of the igniter 61.

The present embodiment has the same effects as the first embodiment. In addition, the present embodiment has the following effects. Firstly, since the material of the solid rocket motor according to the present embodiment is the material having higher ignition temperature as compared with the first embodiment, it is possible to reduce risk of spontaneous ignition at unexpected time. In addition, regarding the solid rocket motor having high ignition temperature, there are materials which can generate a large amount of energy per unit area or per unit mass as compared with the solid rocket motor having low ignition temperature. Therefore, it is possible to improve ignition performance for the gas mixture of the air and the fuel, and reduce a size of the igniter. In addition, by providing the stagnation former 65 and greatly increasing the temperature and pressure in the forward region of the stagnation former 65, the autoignition of the igniter 61 becomes more reliable. Further, when the stagnation former 65 is constituted by the material which automatically disappears by the heat and pressure after the activation of the igniter 61, performance degradation of the engine 2 can be avoided.

Third Embodiment

Figure 9:
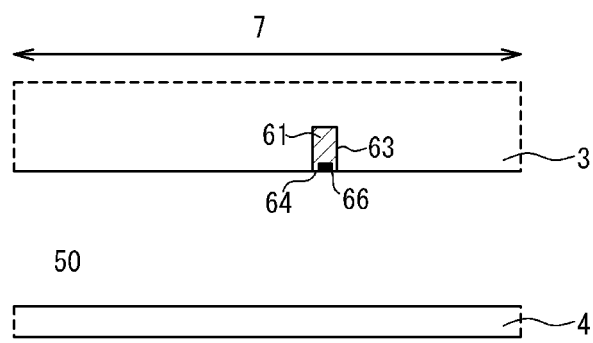
FIG. 9 is a schematic cross-sectional view schematically indicating a configuration of a jet engine combustor 7 according to a third embodiment, and indicating the state before the engine and the igniter start.
Figure 10:
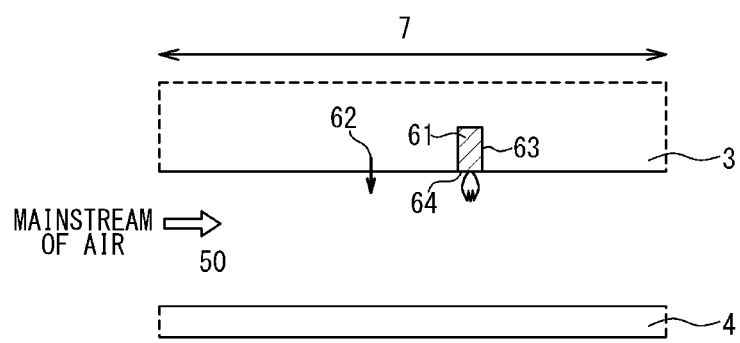
FIG. 10 is a schematic cross-sectional view schematically indicating the configuration of the jet engine combustor 7 according to the third embodiment, and indicating the state at time of starting the engine and the igniter.

Hereinafter, with reference to FIG. 9 and FIG. 10, the jet engine according to the present embodiment will be explained. FIG. 9 and FIG. 10 are the schematic cross-sectional views schematically indicating the example of the configuration of the combustor 7 of the jet engine according to the third embodiment. FIG. 9 is the view indicating the state before the engine and the igniter start. FIG. 10 is the view indicating the state at the time of starting the engine and the igniter.

In the third embodiment, for the same components as those of the first embodiment, the same reference numerals are used. The third embodiment differs from the first embodiment in points in which the igniter 61 includes an ignition explosive 66 in the third embodiment, and the ignition temperature of the igniter 61 such as the rocket motor of the third embodiment is higher than that of the first embodiment.

The ignition explosive 66 is provided in the igniter surface portion 64 or in the vicinity of the igniter surface portion 64. Typically, for example, as shown in FIG. 9 and FIG. 10, the ignition explosive 66 is provided in the igniter surface portion 64.

Operating principle of the igniter 61 according to the present embodiment will be explained. Using the separation of the inlet cover 9, the separation of the nozzle cover 10 etc. as a trigger, the mainstream of air enters the space 50. As in the first embodiment, the mainstream of air is compressed. Then, as the temperature and pressure in the mainstream of air increase, the temperature and pressure on the igniter surface portion 64 also increase. When the temperature and the pressure on the igniter surface portion 64 rise and the temperature and the pressure of the ignition explosive 66 provided in the igniter surface portion 64 or in the vicinity of the igniter surface portion 64 exceed ignition temperature of the ignition explosive 66, the ignition explosive 66 explodes. Then, in accordance with the explosion of the ignition explosive 66, the igniter 61 automatically catches fire, and emits the flame toward the space 50. In the third embodiment, since the rocket motor, which is igniter 61, is ignited using the ignition explosive 66, it is possible to adopt the solid rocket motor having higher ignition temperature in the present embodiment as compared with the solid rocket motor used in the first embodiment. For example, in the present embodiment, the solid rocket motor having high ignition temperature which catches fire at 400 degrees Celsius can be used. As the solid rocket motor having high ignition temperature, for example, AP/C$_2$H$_4$O/Al which catches fire at 400 degrees Celsius is exemplified.

The present embodiment has the same effects as the first embodiment. In addition, the present embodiment has the following effects. Firstly, since the rocket motor, which is the igniter 61, is ignited using the ignition explosive 66 according to the present embodiment, the ignition of the igniter 61 is more reliable. In addition, regarding the solid rocket motor having high ignition temperature, there are materials which can generate a large amount of energy per unit area or per unit mass as compared with the solid rocket motor having low ignition temperature. Therefore, it is possible to improve ignition performance for the gas mixture of the air and the fuel, and to reduce a size of the igniter.

Fourth Embodiment

Figure 11:
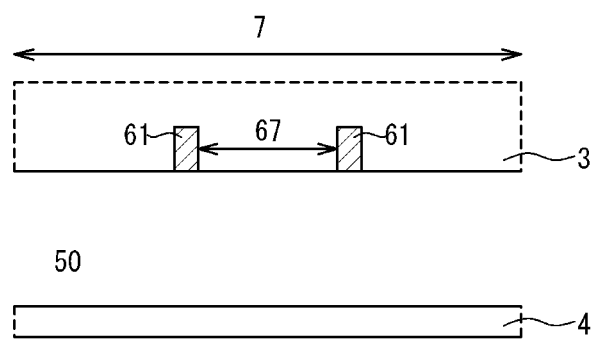
FIG. 11 is a schematic cross-sectional view schematically indicating a configuration of a jet engine combustor 7 according to a fourth embodiment, and indicating the state before the engine and the igniter start.

Hereinafter, with reference to FIG. 11, the jet engine according to the present embodiment will be explained. FIG. 11 is the schematic cross-sectional view schematically indicating the example of the configuration of the combustor 7 of the jet engine according to the fourth embodiment. FIG. 11 is the view indicating the state before the engine and the igniter start.

In the fourth embodiment, for the same components as those of the first embodiment, the same reference numerals are used. The fourth embodiment differs from the first embodiment in a point in which a plurality of the igniters 61 are provided along a longitudinal direction of the engine at some points (two points in FIG. 11) in the fourth embodiment. A distance 67 between igniters 61 is set to a distance such that emission of the flame from one igniter 61 cannot propagate to another igniter 61. Thus, even when the one igniter 61 is autoignited at unexpected time, another igniter 61 is kept in a non-activated state. Therefore, even when the one igniter 61 becomes unavailable because of the unexpected ignition etc., it is possible to control the timing of the start of the jet engine by using another igniter 61.

The present embodiment has the same effects as the first embodiment. In addition, the present embodiment has the following effects. That is, even when the one igniter 61 becomes unavailable, it is possible to control the timing of the start of the jet engine by using another igniter 61. Thus, the reliability of the jet engine operation is improved.

Note that the above-mentioned embodiments are examples in which the jet engine is applied to the flying body. The flying body includes an aircraft, a rocket, etc.

The present invention is not limited to each of the above-mentioned embodiments. Various modifications can be performed on each of the above-mentioned embodiments without departing from the spirit or scope of the general inventive concept of the present invention. In addition, various techniques used in some embodiments or alternatives can be applicable to other embodiments or alternatives as long as the technical contradiction does not occur. For example, in FIGS. 3 to 4 and FIGS. 6 to 11, a flame holder is not described. However, it is possible that the flame holder is provided in the vicinity of the igniter 61, and the flame for continuously burning the gas mixture of the fuel and the air is kept by the flame holder. Moreover, it is possible to combine configurations of each embodiment. For example, it is possible to combine a configuration of providing the stagnation former according to the second embodiment with a configuration of providing a plurality of the igniters 61 according to the fourth embodiment.

This application claims a priority based on Japan Patent Application No. JP 2014-64200 filed on Mar. 26, 2014, the disclosure of which is hereby incorporated by reference herein in its entirety.

The invention claimed is:

1. A combustor in which fuel is burned using air taken through an inlet, comprising:
   a plurality of stagnation formers protruding from a combustor wall, contacting with the combustor wall and configured to locally dam the air which has been taken through the inlet;
   a plurality of igniters for igniting a gas mixture of the air and the fuel; and
   a passage through which the air flows,
   wherein each of the plurality of igniters is configured to emit a flame by burning at least one of a solid fuel and an ignition explosive which automatically catches fire due to heat and pressure created by compression of the air which has been taken through the inlet,
   wherein each of the plurality of igniters is configured to autoignite and be activated due to the heat and the pressure created by the compression of the air which has been dammed by at least one of the plurality of stagnation formers,
   wherein the plurality of the igniters are arranged such that, in a state prior to autoignition of any of the plurality of the igniters, adjacent ones of the plurality of igniters are spaced apart from one another at a distance such that the flame from a first one of the adjacent ones of the plurality of the igniters cannot propagate to a second one of the adjacent ones of the igniters,
   wherein at least a part of each of the plurality of the igniters faces the passage,
   wherein the combustor wall forms a wall surface of the passage, and each of the plurality of the igniters extends into the wall surface of the passage in a first direction, and
   wherein each of the plurality of the stagnation formers protrudes away from the wall surface of the passage in an opposite direction to the first direction.

2. The combustor according to claim 1, wherein the plurality of igniters are embedded in a groove in the wall surface.

3. The combustor according to claim 1, wherein an igniter driver for starting the plurality of igniters and an igniter controller for generating a signal to start the igniter driver are not provided in the combustor.

4. The combustor according to claim 1, wherein each of the plurality of stagnation formers is disposed rearward of a corresponding one of the plurality of igniters.

5. A jet engine comprising:
   a combustor in which fuel is burned using air taken through an inlet, comprising:
      a plurality of stagnation formers protruding from a combustor wall, contacting with the combustor wall and configured to locally dam the air which has been taken through the inlet;
      a plurality of igniters for igniting a gas mixture of the air and the fuel; and
      a passage through which the air flows,
      wherein each of the plurality of igniters is configured to emit a flame by burning at least one of a solid fuel and an ignition explosive which automatically catches fire due to heat and pressure created by compression of the air which has been taken through the inlet,
      wherein each of the plurality of igniters is configured to autoignite and be activated due to the heat and the pressure created by the compression of the air which has been dammed by at least one of the plurality of stagnation formers,
      wherein the plurality of the igniters are arranged such that, in a state prior to autoignition of any of the plurality of the igniters, adjacent ones of the plurality of igniters are spaced apart from one another at a distance such that the flame from a first one of the adjacent ones of the plurality of the igniters cannot propagate to a second one of the adjacent ones of the igniters,
      wherein at least a part of each of the plurality of the igniters faces the passage,
      wherein the combustor wall forms a wall surface of the passage, and each of the plurality of the igniters extends into the wall surface of the passage in a first direction, and
      wherein each of the plurality of the stagnation formers protrudes away from the wall surface of the passage in an opposite direction to the first direction;
   an inlet located forward of the combustor; and
   a nozzle located rearward of the combustor.

6. The jet engine according to claim 5, further comprising:
   an inlet cover located forward of the inlet,
   wherein the inlet cover is configured to suppress the compression of the air before the inlet cover is separated from the inlet, and
   wherein each of the plurality of igniters is configured to autoignite and be activated due to the heat and the pressure created by the compression of the air after the inlet cover is separated from the inlet.

7. The jet engine according to claim 5, further comprising:
   a nozzle cover located rearward of the nozzle,
   wherein the nozzle cover is configured to suppress the compression of the air before the nozzle cover is separated from the nozzle, and
   wherein each of the plurality of igniters is configured to autoignite and be activated due to the heat and pressure created by the compression of the air after the nozzle cover is separated from the nozzle.

* * * * *